March 29, 1938. H. V. JAMES 2,112,440
TIRE VULCANIZER
Filed Aug. 4, 1936 2 Sheets-Sheet 1
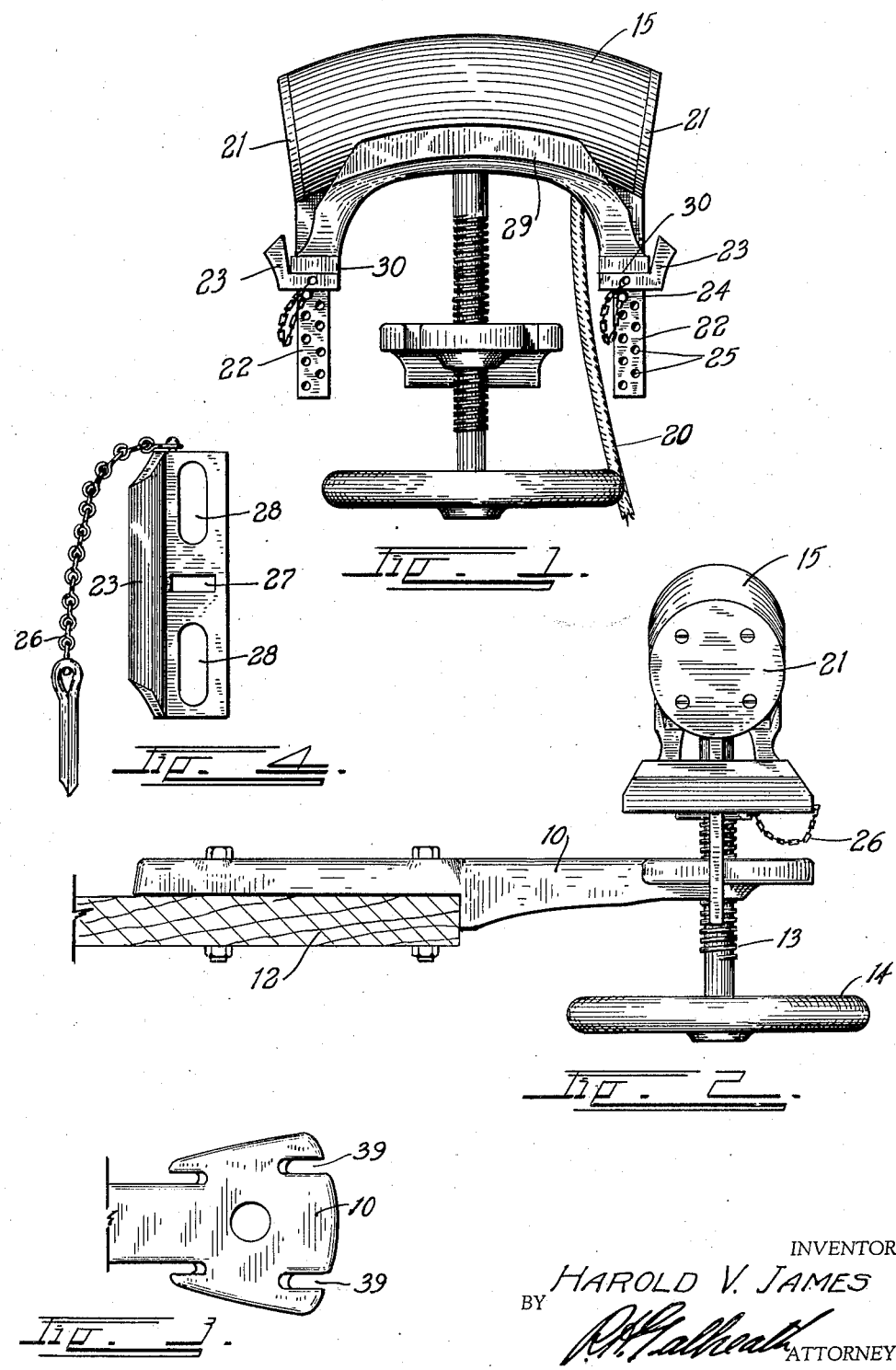
INVENTOR.
HAROLD V. JAMES

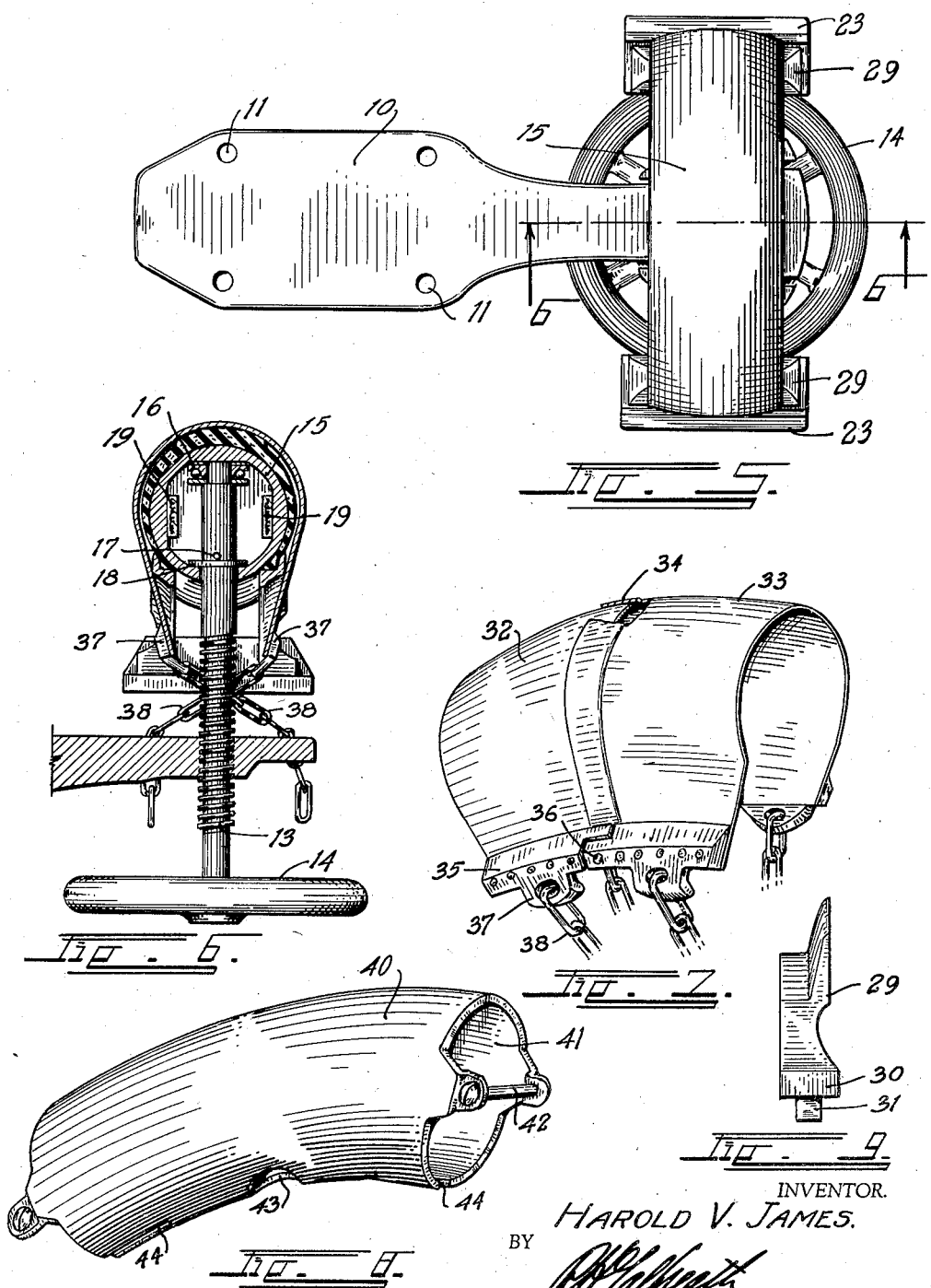

Patented Mar. 29, 1938

2,112,440

UNITED STATES PATENT OFFICE 2,112,440

TIRE VULCANIZER

Harold V. James, Denver, Colo.

Application August 4, 1936, Serial No. 94,273

8 Claims. (Cl. 18—18)

This invention relates to a tire casing vulcanizer, and is more particularly designed as an improvement over my prior Patent No. 2,010,861. The principal object of this invention is to provide a device for vulcanizing repairs in tire casings which will be universally applicable to casings in various sizes; which will prevent overcuring or burning of the casing around the repair; and which can be used for making repairs adjacent to or at the bead of the casing.

Another object of the invention is to provide a tire casing vulcanizer in which an even and uniform pressure can be obtained over a repair at any position on a casing of any size.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is an end elevation of the improved vulcanizer.

Fig. 2 is a side elevation thereof.

Fig. 3 is a plan view of the outer extremity of the base plate employed in the invention.

Fig. 4 is a detail plan view of the cross bar for supporting the casing bead.

Fig. 5 is a plan view of the vulcanizer.

Fig. 6 is a cross section taken on the line 6—6, Fig. 5, with a casing and clamping hood in place thereon.

Fig. 7 is a detail perspective view illustrating the flexible clamping hood employed with the invention.

Fig. 8 is a similar view illustrating an enlarging shell which may be used with the invention.

Fig. 9 is a detail end view of the bead iron.

The invention comprises a base plate 10 provided at its one extremity with suitable bolt holes 11 by means of which it may be attached to a work bench such as indicated at 12, or other suitable supporting structure. A vertically positioned jack screw 13 is threaded through the outer extremity of the plate 10. The lower extremity of the jack screw 13 is provided with a hand wheel 14 to facilitate rotation thereof.

The upper extremity of the jack screw pivotally supports a hollow, arcuate, casing-shaped casting 15, preferably of aluminum. The screw passes through the bottom wall of the casting 15, and terminates in a thrust bearing 16 against the upper wall thereof. The casting is locked in place on the screw by means of a suitable cotter key 17 positioned above a retaining washer 18. The casting 15 is provided with suitable electric heating elements 19 to which current is supplied by means of an electrical conductor 20. The extremities of the casting 15 are closed by means of end plates 21.

Each of the end plates 21 is formed with a downwardly depending leg 22 positioned substantially on the center line of the casting. Each leg supports an adjustable cross bar 23. The cross bars 23 may be positioned at any desired heighth by adjusting a supporting pin 24 in a series of perforations 25 with which each leg 22 is provided. To prevent loss, the pins 24 are attached to the extremities of suitable retaining chains 26.

The cross bars 23 are each provided with a rectangular central opening 27 for the passage of the leg 22, and with elongated side openings 28. The cross bars 23 support a pair of bead irons 29 which extend in parallel relation to the casting 15 and terminate at their extremities in feet 30 which rest upon the cross bars 23. Each of the feet 30 is formed with a downwardly depending stud 31 which enters into the elongated slots 28 of the cross bars 23. These elongated openings allow lateral movement of the bead irons.

The casing is held against the casting 15 by means of a flexible metallic shield such as shown in Fig. 6. The shield consists of two hood-shaped sections 32 and 33, telescopically fitted together as indicated at 34. Each of the sections 32 and 33 is formed with a heavy lower stiffening member 35, secured along their lower edges. The two stiffening members 35 are hinged together on a pivot rivet 36 so that they may be bent or rotated with relation to each other, the two sections 32 and 33 sliding at the joint 34, so as to accommodate casings of various diameters. The stiffening members 35 are formed with ears 37 from which tension chains 38 depend. The base member 10 is formed with four narrow slots 39 for receiving the lengths of the chains 38.

Operation

Let us assume that the operator is making a tread repair only. After the operator has built up his repair in the tread of the tire casing, he places the casing over the casting 15 with the repaired section approximately at the midpoint thereof. He then places the hood of Fig. 6 over the casing, bringing the chains through the slots 39 in crossed relation, as shown in Fig. 5. He then lifts the cross bars 23 so that they will engage the entire bead at each extremity of the casting 15. The bead irons 29 are not needed for a tread repair and the cross bars 23 are employed to lift the end portions of the casing away from the casting 15 to prevent overcuring or burning thereof at the extremities of the casting 15. This also serves to force the cut or repaired section together so as to prevent an oversize repair. He then locks the cross bars in the raised position by means of the pins 24 and tightens the screw 13 so as to force the casting 15 upwardly.

As the screw raises it increases the tension in the chains 38, and forces the casing into the hood sections 32 and 33 so that the latter conform to the shape of the casing and snugly enclose the latter. It is desired to call attention to the fact that the pressure is distributed by the flexible hood over the entire surface of the casing so that a uniform pressure and a uniform cure is obtained.

When a repair close to the bead is being made, the bead irons 29 are placed in position before the hood is placed over the tire, and the chains are brought around about and under the bead irons. This causes the increasing tension in the chains to squeeze the bead irons toward each other so as to snugly enclose the bead section of the casing.

The casting 15 is of a size to handle the smallest expected casing, and will handle casings of larger sizes until the bead portions thereof strike the screw 13. For still larger casings, enlarging shells such as shown in Fig. 7 are employed. These shells consisting of two similar sections 40 and 41 are clamped together at their extremities by means of clamp bolts 42. The sections are notched at 43 and 44 to provide passage for the screw 13, and the lugs 22 respectively.

The inner faces of the sections 40 and 41 are contoured to fit snugly against the casing. The outer surface is contoured to fit to the interior of the larger casing.

In use, the two sections are positioned on each side of the casting 15, and are clamped thereon by means of the clamp screws 42. It can be readily seen that this will increase the diameter of the casting 15 to accommodate larger tires. The operation with the enlarger in place is similar to the operation previously described.

For additional heat where desired, an outer heater can be applied to the outside of the hood as shown in applicant's prior Patent No. 2,010,861.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A casing vulcanizer comprising: a base plate; a jack screw threaded through and extending vertically from said base plate; an arcuate heating form pivotally supported on said screw; a hood for clamping a casing to said heating member; legs extending downward from each extremity of said heating member; and vertically adjustable cross members mounted on said legs; and bead irons extending between said cross members in parallel relation with said heating member and with each other.

2. A casing vulcanizer comprising: a base plate; a jack screw threaded through and extending vertically from said base plate; an arcuate heating form pivotally supported on said screw; a hood for clamping a casing to said heating member; legs extending downward from each extremity of said heating member; vertically adjustable cross members mounted on said legs; bead irons extending between said cross members in parallel relation with said heating member and with each other; means for permitting lateral movement of said bead irons on said cross members; and means for adjustably supporting said cross members on said legs.

3. A casing vulcanizer comprising: a base plate; a jack screw threaded through and extending vertically from said base plate; an arcuate heating form pivotally supported on said screw; a hood for clamping a casing to said heating member; arcuate bead irons positioned along each side of said heating member; and means for adjustably supporting said bead irons so that they may be moved both laterally and vertically with reference to said heating member.

4. A casing vulcanizer comprising: a base plate; a jack screw threaded through and extending vertically from said base plate; an arcuate heating form pivotally supported on said screw; a hood for clamping a casing to said heating member; arcuate bead irons positioned along each side of said heating member; means for adjustably supporting said bead irons so that they may be moved both laterally and vertically with reference to said heating member; flexible members passing about said bead irons; and means for tightening said flexible members so as to cause the latter to force said bead irons against a casing positioned on said heating member.

5. A casing vulcanizer comprising: a base plate; a jack screw threaded through and extending vertically from said base plate; an arcuate heating form pivotally supported on said screw; a hood for clamping a casing to said heating member; legs extending downward from each extremity of said heating member; vertically adjustable cross members mounted on said legs; bead irons extending between said cross members in parallel relation with said heating member and with each other; and projections formed on the extremities of said bead irons, there being elongated openings in said cross members for receiving said studs so that said bead irons may have lateral movement therein with reference to said heating member.

6. The combination with a casing vulcanizer of the type described having an arcuate casing shaped heating member, of two similar shell sections each having an inner contour corresponding to the outer contour of said heating member; and means for clamping said sections together about said heating member to increase the effective heated area of the latter.

7. Means for clamping a tire casing to an arcuate heating member comprising: a plurality of flexible, casing-shaped hood members; means for pivotally securing said hood members together at their open sides in axial alignment with each other; and means for forcing said heating member into said hood members so as to clamp a tire casing therebetween, said pivotal securing means allowing said hood members to slide with reference to each other so as to conform to the annular diameter of said casing.

8. Means for clamping a tire casing to an arcuate heating member comprising: a plurality of flexible, casing-shaped hood members; and means for forcing said heating member into said hood members so as to clamp a casing therebetween, said hood members being telescopically fitted together so that they may slide with reference to each other at their outer sides to conform to the annular diameter of said casing.

HAROLD V. JAMES.